(12) United States Patent
Braun et al.

(10) Patent No.: US 7,197,723 B2
(45) Date of Patent: Mar. 27, 2007

(54) SEMICONDUCTOR DEVICE MANUFACTURING

(75) Inventors: Christopher P. Braun, Bath, PA (US); William Brodsky, Macungie, PA (US); Gerard Joseph Krupka, Allentown, PA (US); William Perry Wilkinson, Allentown, PA (US); Thomas Allen Polk, Lehighton, PA (US); Gregory Paul Van Allen, Kutztown, PA (US); John M. Sosik, Laurys Station, PA (US); Evelyn E. Roadcap, Boyertown, PA (US)

(73) Assignee: Agere Systems, Inc., Allentown, PA (US)

( * ) Notice: Subject to any disclaimer, the term of this patent is extended or adjusted under 35 U.S.C. 154(b) by 246 days.

(21) Appl. No.: 10/953,480

(22) Filed: Sep. 29, 2004

(65) Prior Publication Data

US 2006/0074506 A1    Apr. 6, 2006

(51) Int. Cl.
*G06F 17/50* (2006.01)

(52) U.S. Cl. .................. 716/3; 716/1; 700/96
(58) Field of Classification Search .............. 716/3, 716/1; 700/96, 121; 705/59
See application file for complete search history.

(56) References Cited

U.S. PATENT DOCUMENTS

| | | | |
|---|---|---|---|
| 5,644,493 A | 7/1997 | Motai et al. ............... 700/96 |
| 5,819,062 A | 10/1998 | Srikantappa ............... 716/11 |
| 5,848,263 A | 12/1998 | Oshikiri ..................... 716/3 |
| 5,933,350 A | 8/1999 | Fujimoto et al. .......... 716/19 |
| 6,081,811 A | 6/2000 | Nilsson .................... 707/201 |
| 6,249,786 B1 | 6/2001 | Wadewitz .................. 707/6 |
| 6,336,056 B1 | 1/2002 | Fujimoto et al. ........ 700/121 |
| 6,445,974 B1 | 9/2002 | Malaugh et al. ......... 700/182 |
| 6,684,372 B2 | 1/2004 | Tom et al. ................. 716/3 |
| 6,686,914 B2 | 2/2004 | Keener .................... 345/420 |
| 6,691,122 B1 | 2/2004 | Witte et al. .............. 707/101 |
| 6,725,237 B2 | 4/2004 | Clairmont et al. ....... 709/203 |
| 2004/0237054 A1* | 11/2004 | Tsai et al. ................... 716/1 |

* cited by examiner

*Primary Examiner*—Sun James Lin

(57) ABSTRACT

In a system including a plurality of diverse semiconductor manufacturing facilities, each of the facilities having a respective manufacturing process requiring semiconductor specific design information in a corresponding diverse format, a method for supplying data to each of the facilities in an appropriate format includes establishing a database for each of the plurality of facilities, the database identifying the appropriate format for each of the facilities. The method also includes receiving semiconductor specific design information and converting the design information in accordance with the appropriate format for one of selected ones of the facilities. The method further includes providing a respective tapeout to said one of the selected ones of the facilities, each tapeout comprising the design information formatted in the appropriate format for the respective facility receiving the tapeout.

6 Claims, 5 Drawing Sheets

SEMICONDUCTOR DEVICE MANUFACTURING

FIELD OF THE INVENTION

The present invention relates to semiconductor device manufacturing and, in particular, to a method for supplying data to each of a plurality of semiconductor manufacturing facilities in an appropriate format.

BACKGROUND OF THE INVENTION

In the past, semiconductor device design and manufacturing were typically performed at the same facility. However, the current trend in semiconductor manufacturing is to perform the design function at one or more design facilities and then to outsource manufacturing by sending the semiconductor design information to one or more manufacturing facilities, or foundries, to fabricate the device according to the received design information.

For example, FIG. 1 shows a known semiconductor design and manufacturing system 10 including a plurality of design centers 12 providing semiconductor device design information, such as in a form commonly known as a "tapeout," to a plurality of foundries 14 to produce a production run of a semiconductor design. The tapeout information may include semiconductor design information derived from a plurality of sources involved with the design, manufacturing processes, and quality control of a semiconductor production run. One of the problems with such a system is that each of the foundries 14 may have a respective manufacturing process requiring that semiconductor specific design information be provided in a specific format tailored for that foundry 14. For example, each foundry 14 may require different forms to be filled out detailing a semiconductor manufacturing process and provided with the design information for a device to be produced. Typically, a different form must be filled out by the design center 12 for each respective foundry 14 that the design center 12 wishes to send a semiconductor manufacturing run. Such forms are typically filled out manually for each different foundry selected to manufacture the desired semiconductor device and may include multiple pages of check boxes that are required to be completed for each foundry selected. This manual process of filling out complicated forms is known to be error prone and time consuming, especially when more than one foundry has been selected to produce a desired semiconductor device.

It is understood that the following detailed description is exemplary and explanatory only and not to be viewed as being restrictive of the present invention as claimed. These and other aspects, features and advantages of the present invention will become apparent after a review of the following description of the preferred embodiments and the appended claims.

DESCRIPTION OF PREFERRED EMBODIMENTS

Figure 1:
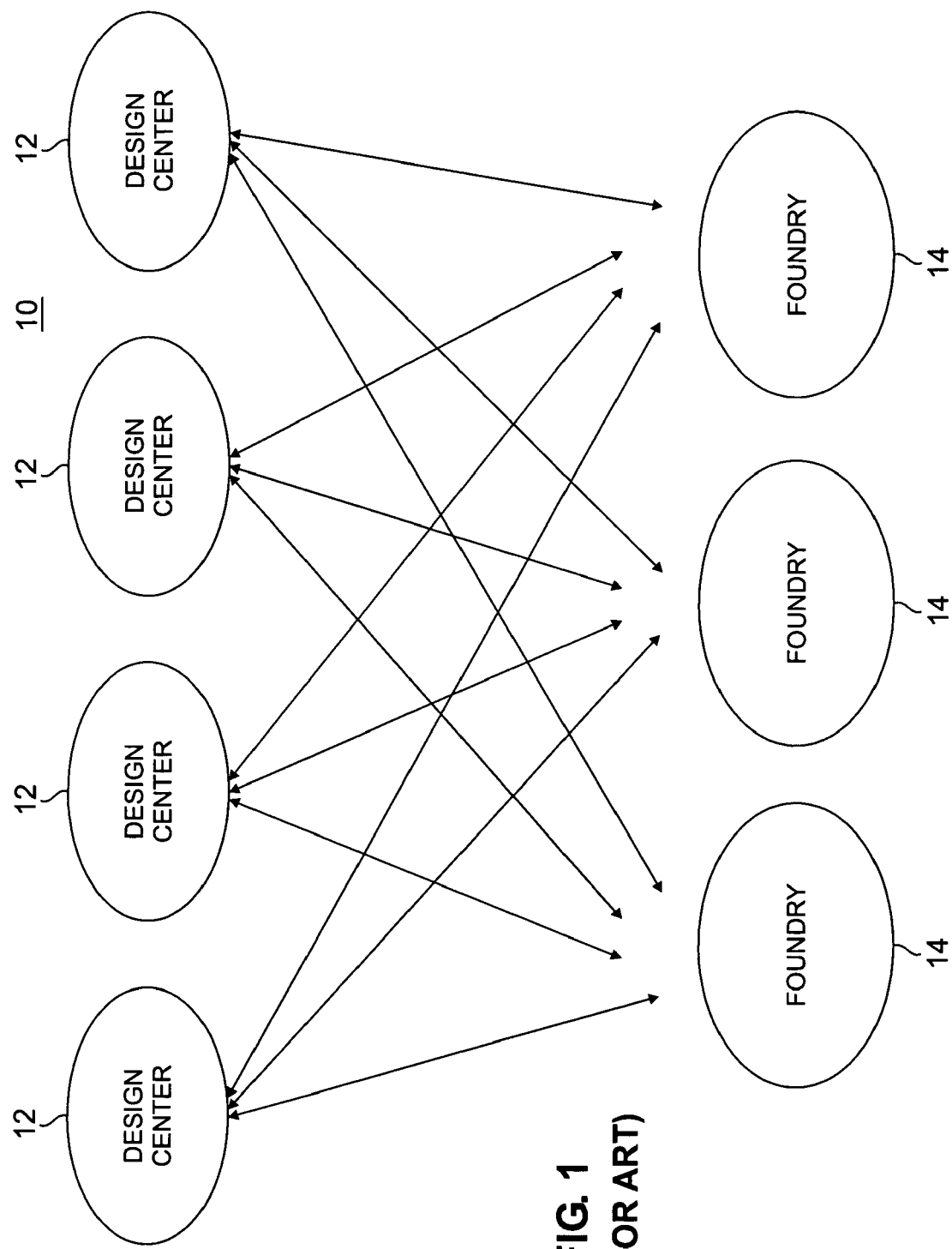
FIG. 1 shows a diagram of a semiconductor manufacturing system having a plurality of design centers in communication with a plurality of manufacturing facilities.
Figure 2:
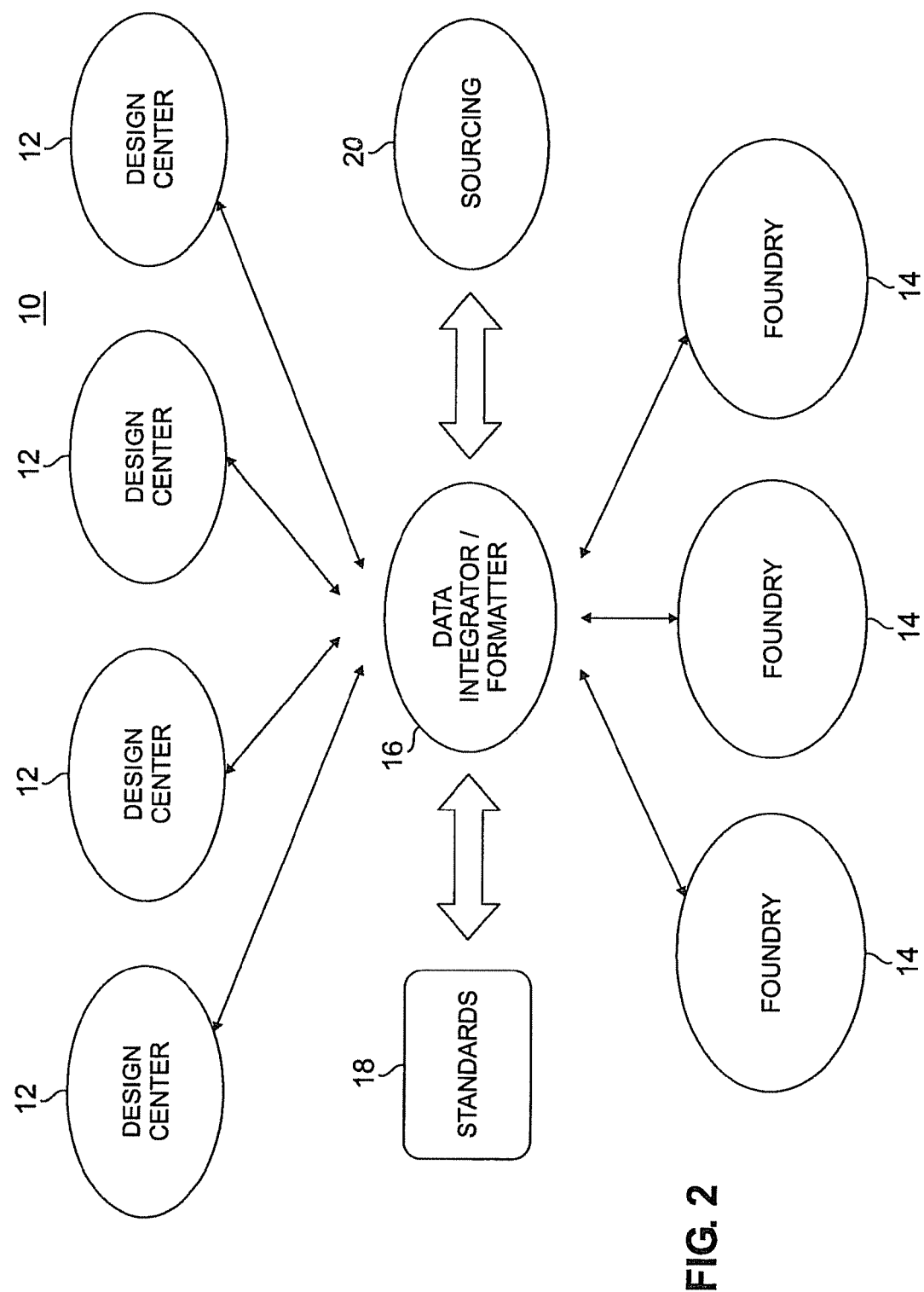
FIG. 2 shows a block diagram of an exemplary embodiment of a semiconductor manufacturing system having a plurality of semiconductor design centers, a data integrator/formatter, and a plurality of foundries.

FIG. 2 shows a block diagram of an exemplary semiconductor manufacturing system 10 having a plurality of semiconductor design centers 12, a data integrator/formatter 16, and a plurality of foundries 14. In an embodiment of the invention, the data integrator/formatter 16 receives semiconductor design information from one or more of the design centers 12 and information related to a semiconductor design manufacturing run from other sources, such as a sourcing group 20 and a semiconductor device standards group 18, and integrates the semiconductor information received from these various groups 18, 20. The sourcing group 20 may provide information related to selecting foundries to produce a desired semiconductor device and the semiconductor device standards group 18 may provide information related to production standards to manufacture a desired semiconductor device.

In an embodiment of the invention, the integrator/formatter 16 converts the semiconductor information received from the various groups 18, 20 into a format appropriate for each of the foundries 14 selected to produce the desired semiconductor device, for example, by providing a tapeout including semiconductor information formatted in a manner required by the foundry 14. In an aspect of the invention, the semiconductor information received from the various groups 18, 20 is provided in a common generic format that is converted to one or more foundry specifics formats to be provided to a selected foundries 14. The integrator/formatter 16 may comprise a known computer system, such as a server configured for storing and processing information and having an interface for receiving and sending information, such as an Internet interface.

Figure 3:
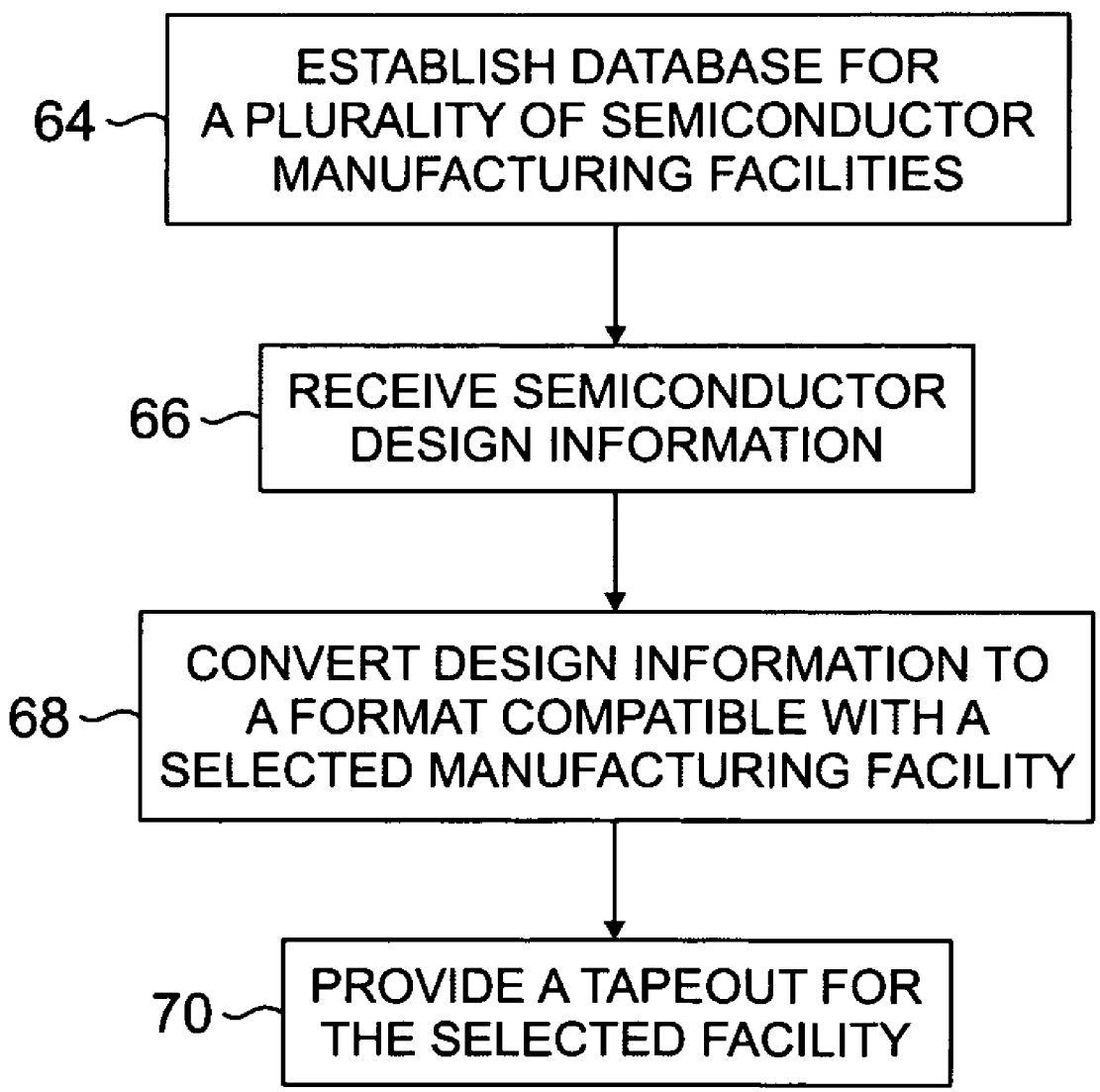
FIG. 3 is a flow chart for a method for supplying formatted data to each of the facilities in a semiconductor manufacturing system.

FIG. 3 shows a flow chart 62 for an exemplary method for supplying appropriately formatted semiconductor manufacturing data to each of the facilities 14 in a semiconductor manufacturing system 10 in the manner described above. The method includes first establishing a database 64 for a plurality of semiconductor manufacturing facilities, for example, identified by a sourcing group 20 as being capable of manufacturing a specific semiconductor design and having a manufacturing capacity for manufacturing a desired manufacturing lot of a semiconductor device within a desired time period. The method further includes receiving semiconductor design information that may include a semiconductor design, production information and quality control information. The semiconductor design information may be formatted in a generic format common to all design centers from which the semiconductor design information is received. The received semiconductor design information is then converted into a format that is compatible with a manufacturing facility that has been selected to manufacture the semiconductor device. The selected foundries and the format for each selected foundry may have been included in the semiconductor design information received by the data integrator/formatter 16 or may have been previously stored in the database. After converting the semiconductor design information, the converted information and other information necessary to produce a desired semiconductor device is assembled into a foundry specific tapeout for each selected foundry that includes semiconductor information formatted in a foundry specific form.

Figure 4:
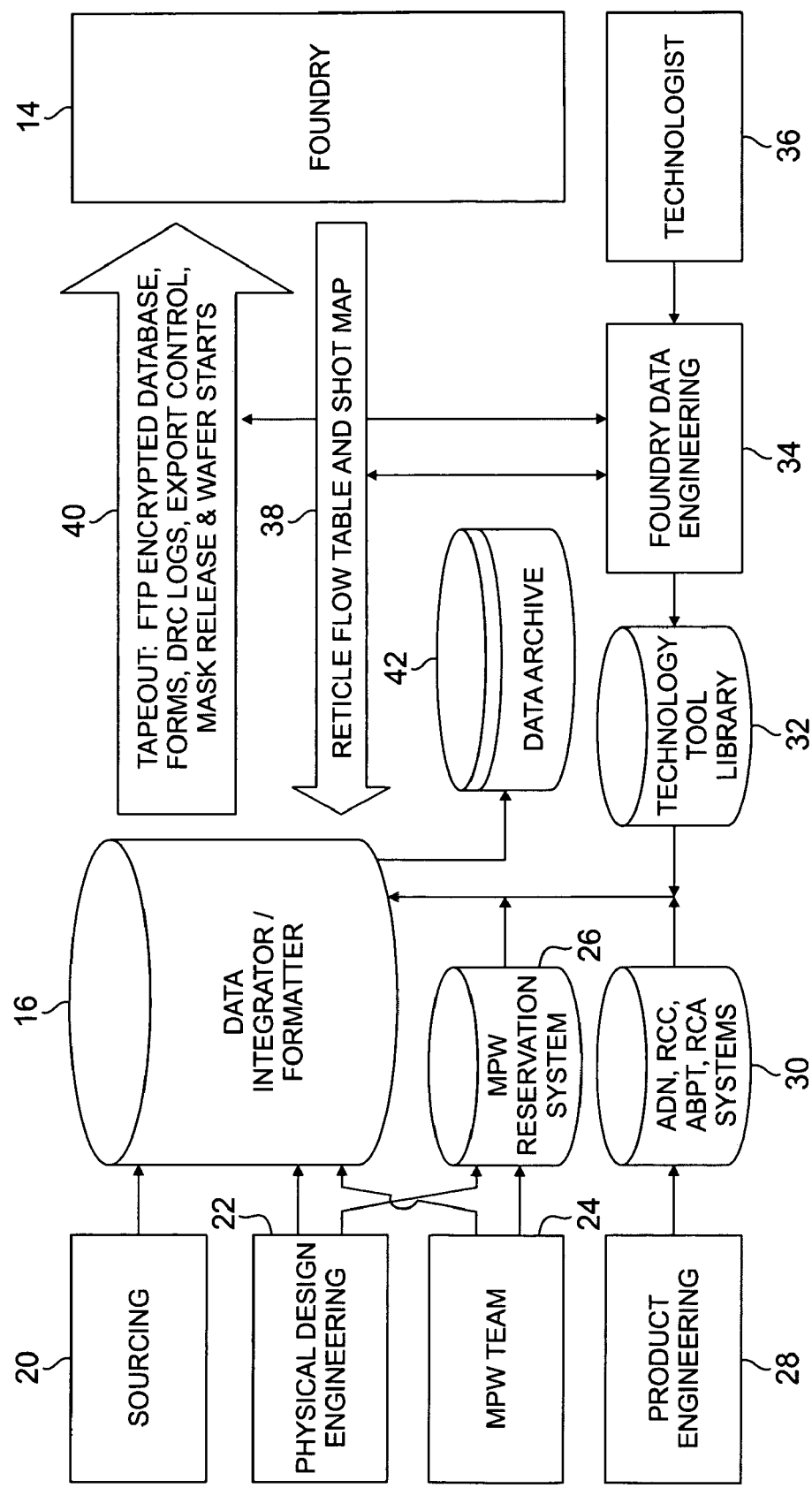
FIG. 4 shows a more detailed schematic diagram of the data integrator/formatter of FIG. 2 and associated blocks.

FIG. 4 shows a more detailed block diagram of the system 10 of FIG. 2 including an exemplary embodiment of a data integrator/formatter 16 for implementing the method depicted in FIG. 3. The data integrator/formatter 16 may include a database for receiving and storing semiconductor design and production information from a plurality of groups involved in a semiconductor design process.

In an initial phase of a semiconductor device development process, a sourcing group 20 may provide information related to the business management of relationships with respective foundries, such as establishing which foundries 14 are capable of producing a desired production run of a semiconductor device design, to the data integrator/formatter 16. The sourcing group 20 polls the available foundries 14 to determine which of the foundries 14 may have a capacity to produce a production run of a semiconductor device, selects one or more desired foundries to produce the device, and provides the selected foundries to the data integrator/formatter 16 so that the data integrator/formatter 16 can format the semiconductor design information in an appropriate foundry specific format. The data integrator/ formatter 16 receives semiconductor device design information, such as CAD drawings of the semiconductor provided in a GDS or other design format that contain the physical layout of the semiconductor circuit, from the physical design engineering group 22.

The data integrator/formatter 16 may also receive information from a multi-project wafer (MPW) group 24 that manages overall semiconductor design projects and may include management oversight of licensed IP blocks that may be used in a semiconductor device design. The MPW group 24 may also provide information to a MPW reservation system database 26 which may store multiple semiconductor designs, for example, provided by a physical design engineering team 22, for project managers to use on various different semiconductor projects, such as by sharing of a tapeout 40 for a variety of projects that may need the same design. Accordingly, the reservation system 26 may allow multiple semiconductor projects to use the same mask set for other semiconductors, thereby allowing multiple users to use one common mask set instead of having to fabricate respective individual mask sets which may be identical, thus resulting in a cost savings.

The data integrator/formatter 16 may also receive information from product engineering group 28 via a product engineering database 30. The product engineering group 28 may provide information regarding yield, performance and electrical test parameters of a semiconductor device design ad analysis to "tune" a semicoductor manufacturing process for a specific semiconductor device. This information is provided to the product engineering database 30 and may take the form of an advance device notice (ADN), a readiness commitment checklist (RCC), a project management tool (PMT), and root cause analysis (RCA). RCA is part of quality control process that determines the actual reason why a semiconductor failure has occurred. The information stored in the product engineering database 30 may be accessed by the data integrator/formatter 16 at various times during a tapeout process, for example, for quality control of the information contained in the tapeout 40.

The data integrator formatter may also have access to a technology tool library database 32. The technology tool library database 32 may be used to store information related to defining a semiconductor manufacturing process technology. For example, the technology tool library database 32 may include a number and type of mask levels, a tone of the mask levels, specifications, lithography, and reference alignment marks required to align masks.

The technology tool library database 32 may be populated by a foundry data engineering group 34 that defines the semiconductor manufacturing process technology. For example, the foundry data engineering group 34 may determine what technology is needed for a certain product type, that is, a specification of all the manufacturing modules (process logs or recipes) that may be required to produce a specific product type in a certain lithography "node" type, such as a 130 nanometer (nm) node with embedded DRAM, a 130 nm node with embedded SRAM, or a 130 nm node with embedded analog circuitry, each of which may require a different manufacturing technology to implement. The foundry data engineering group 34 may then build a library of different technologies required for a certain node and store this library in the. technology tool library database 32. Upon receipt of a semiconductor design at the data integrator/formatter 16, the data integrator/formatter 16 may then access the technology tool library database 32 to match the design with a technology tool required to implement the design.

A technologist group 36 may evaluate various semiconductor technologies that the foundries 14 provide and determines which foundries 14 are capable of producing a desired technology, such as a specific lithography node, and provides this information to the foundry data engineering group 34.

The foundry data engineering group 34 may also develop a rectile flow table 38 based on a foundry's manufacturing capability, and provide this information to the data integrator/formatter 16. For example, for a 130 nm CMOS process, there may be 33 or more mask levels that need to be manufactured (by the foundry or a third party vendor) to produce the corresponding semiconductor device. The reticle flow table 38 defines parameters such as the mask levels, the specifications of the levels, and the content of each level and the table is integrated with other information for transmission to a selected foundry in tapeout 40 specifically formatted for that foundry.

Once all the necessary semiconductor design information has been received from the various groups and formatted for use by a specific foundry, a tapeout process may be ordered, for example, by the product engineering group 28 and the semiconductor information may be checked and assembled into a tapeout 40 that may include an encrypted database, transmitted, for example, in a file transfer protocol (FTP) format, foundry specific formatted forms, data redundancy check (DRC) logs, export controls information, a reticle flow table, mask release information, and wafer start information. The tapeout 40 may also be stored in a data archive 42 for future reference. When the tapeout is ready to be sent, the tapeout may be transmitted to a designated foundry 14, for example, via the Internet.

Figure 5:
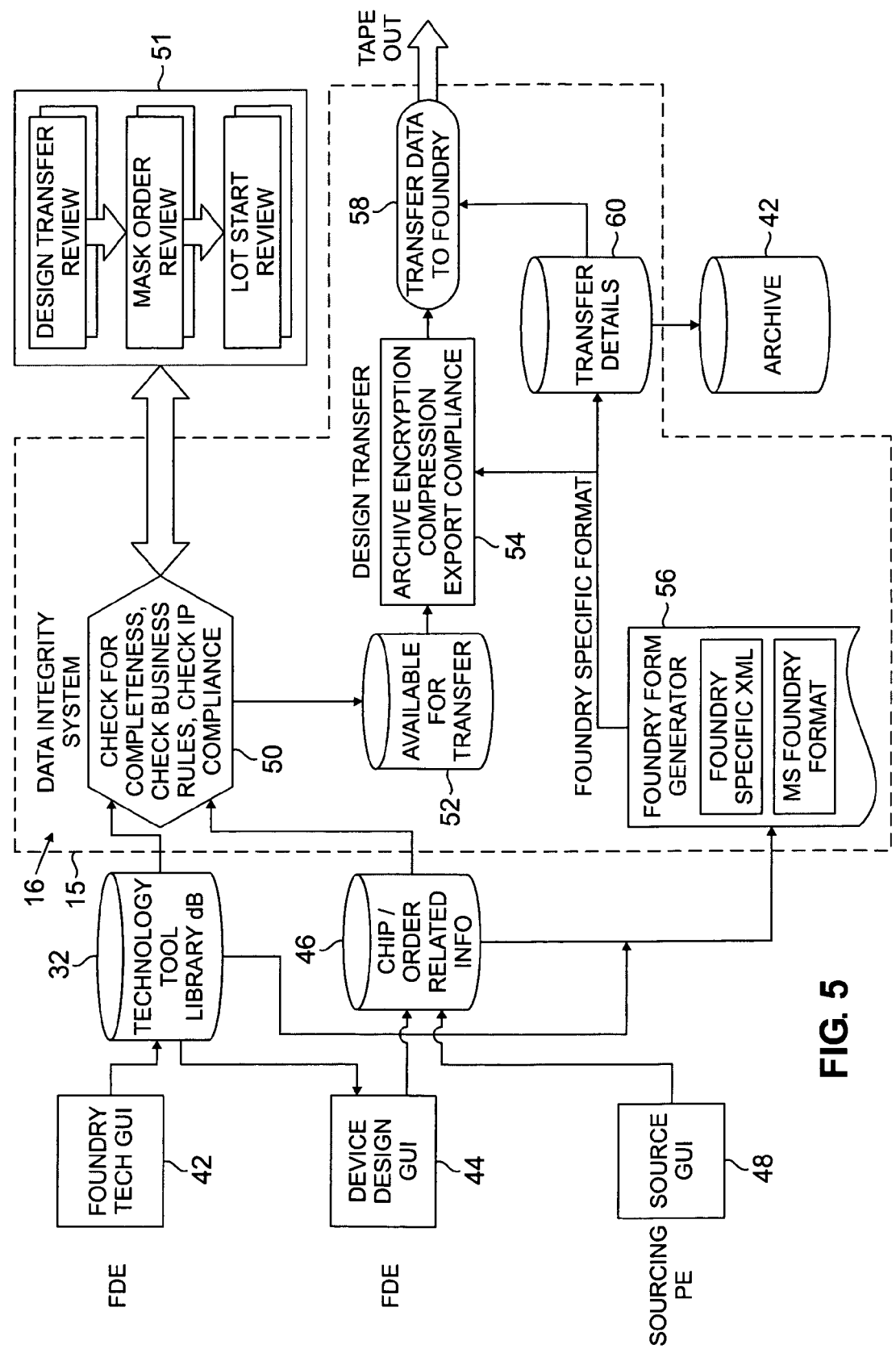
FIG. 5 illustrates a process flow of information through the data integrator formatter of FIG. 2.

FIG. 5 shows a process flow diagram for receiving information into the data integrator/formatter 16 of FIG. 4 and formatting the received information into respective foundry specific formats for transmission to one or more different foundries 12. The process may be implemented on known computing devices that have been programmed to provide operator input graphical user interfaces (GUIs) accessible, for example, over a network such as the Internet, for providing information to the data integrator/formatter 16.

The foundry data engineering (FDE) group 34 may use a foundry technology GUI 42 to enter foundry specific semiconductor fabrication technology that may then be provided to the technology tool library database 32. The physical design engineering (PDE) group 22 may be provided with a semiconductor device design GUI 44 for entering semiconductor device design information that may include GDS or other formatted information, semiconductor device layers, and mask order information. In an aspect of the invention, the information may be required to be input in the semiconductor device design GUI 44 by populating a generic form modeled after forms that foundries typically require. The semiconductor device design information entered using the semiconductor device design GUI 44 may be stored in a chip order and related info database 46. The PDE group 22 may also be able to access the technology tool library database 32 for generating semiconductor device design information.

The sourcing group 20 and product engineering (PE) group 28 may be provided with a source GUI 48 for initiating a semiconductor design information transfer, for example, via the semiconductor device order and related information database 46. The semiconductor device order and related information database 46 may compile semiconductor device design information and information input by sourcing 20 and PE 28 groups to generate semiconductor information, mask information, and lot information provided to the data/integrator formatter 16 (generally indicated by dotted line 15.) The data integrator/formatter 16 may include a data integrity system 50 receiving technical information from the technical tool library database 32 and the semiconductor order related information database 46, for example, to check received semiconductor device information for completeness, to check to insure that the data conforms to business rules, and to check to insure that the design meets intellectual property (IP) compliance rules. The assembled and formatted semiconductor design information may then be checked via interface 51 that allows design transfer review, mask order review, and lot start review. If the design information passes these reviews, then the semiconductor design information is made available for transfer such as by storing the available design in a transfer database 52.

In an aspect of the invention, the data integrator/formatter 16 also receives specific foundry form related information (specifying a specific format for information to be provided to the foundry for manufacturing a semiconductor device) from the technology tool library 32 and receives generically formatted information, such as a generic electronic form having check boxes completed by the PDE group 22 from the semiconductor order database 46. Based on the information received from these sources, the data integrator/formatter 16 converts the design information into a foundry specific format in a foundry form generator process 56. The resulting foundry specific format may be provided to a design transfer process 54 that may include an archive process, an encryption process, a compression process, and an export compliance process. In an aspect of the invention, the export compliance process may check an export control classification and determine if there is an export control license requirement for any of the information to be transferred. If the semiconductor design information includes data that is export controlled but hasn't been licensed for transfer, the export compliance process will detect that an attempt is being made to send unlawful data and, for example, flag that information if it is restricted technology.

The design transfer process 54 readies the assembled, formatted, and checked information (collectively, the manufacturing data) for transmission via process block 58. For transmission of the manufacturing data to respective foundries, a transfer details database 60 may be used to provide specific transfer details required by respective foundries. The manufacturing data to be transferred may also be provided to the archive 42 for future reference.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. In a system including a plurality of diverse semiconductor manufacturing facilities, each of the plurality of diverse semiconductor manufacturing facilities having a respective manufacturing process requiring semiconductor specific design information in a corresponding diverse format, a method for supplying data to each of the plurality of diverse semiconductor manufacturing facilities in an appropriate format comprising:

establishing a database for each of the plurality of diverse semiconductor manufacturing facilities, the database identifying the appropriate format for each of the plurality of diverse semiconductor manufacturing facilities;

receiving semiconductor specific design information;

converting the received semiconductor specific design information in accordance with an appropriate format for one of selected ones of the plurality of diverse semiconductor manufacturing facilities; and providing a respective tapeout to said one of the selected ones of the plurality of diverse semiconductor manufacturing facilities, each tapeout comprising the received semiconductor specific design information formatted in an appropriate format for said one semiconductor manufacturing facility receiving the tapeout.

2. The method of claim 1, wherein the semiconductor specific design information includes a desired number of semiconductor devices to be produced, the method further comprising:

determining a production availability for each of the plurality of diverse semiconductor manufacturing facilities; and selecting at least one of the plurality of diverse semiconductor manufacturing facilities to manufacture a semiconductor device based on the desired number of semiconductor devices to be produced and the production availability of the at least one of the plurality of diverse semiconductor manufacturing facilities.

3. The method of claim 1, further comprising, before providing a respective tapeout, ensuring that providing the converted received semiconductor specific design information is not prohibited by a regulatory agency.

4. The method of claim 1, further comprising, before providing a respective tapeout, ensuring that any intellectual property rights associated with the converted semiconductor specific design information are properly licensed.

5. The method of claim 1, wherein the receiving the semiconductor specific design information comprises:
   providing a generic electronic form to be completed by a semiconductor designer; and
   receiving a completed version of the generic electronic form from the semiconductor designer for a semiconductor specific design.

6. The method of claim 5, wherein the converting the received semiconductor specific design information comprises:
   extracting semiconductor specific design data from a received completed version of the generic electronic form; and
   populating a facility specific form with the semiconductor specific design data from the generic electronic form.

* * * * *